(12) United States Patent
Bay

(10) Patent No.: US 6,584,792 B2
(45) Date of Patent: Jul. 1, 2003

(54) METHOD FOR DRIVING AN OUTPUT STAGE BY PULSE-WIDTH MODULATION

(75) Inventor: Wolfgang Bay, Frankfurt (DE)

(73) Assignee: Mannesmann VDO AG, Frankfurt (DE)

(*) Notice: Subject to any disclaimer, the term of this patent is extended or adjusted under 35 U.S.C. 154(b) by 0 days.

(21) Appl. No.: 09/832,310

(22) Filed: Apr. 9, 2001

(65) Prior Publication Data

US 2001/0045100 A1 Nov. 29, 2001

(30) Foreign Application Priority Data

Apr. 18, 2000 (DE) .......................... 100 19 118

(51) Int. Cl.[7] .............................................. F25B 49/02
(52) U.S. Cl. ...................... 62/228.4; 62/229; 236/46 F; 236/DIG. 9; 165/269
(58) Field of Search ................. 62/228.4, 229; 236/46 F, DIG. 9; 165/267, 268, 269

(56) References Cited

U.S. PATENT DOCUMENTS

| 3,599,864 A | * | 8/1971 | Liddle ....................... 236/46 F |
|---|---|---|---|
| 4,651,535 A | * | 3/1987 | Alsenz ......................... 62/225 |
| 4,938,684 A | * | 7/1990 | Karl et al. ................. 236/46 F |
| 5,731,674 A | | 3/1998 | Jeske .......................... 318/439 |
| 5,785,013 A | | 7/1998 | Sinn et al. ............... 123/41.44 |

FOREIGN PATENT DOCUMENTS

| DE | 4116254 | 11/1991 |
|---|---|---|
| EP | 0413966 | 2/1991 |

OTHER PUBLICATIONS

Patent Abstracts of Japan, vol. 012, No. 174, May 24, 1988 & JP 62 281766 (Hitachi Ltd), Dec. 7, 1987.
Patent Abstracts of Japan, vol. 011, No. 088, Mar. 18, 1987 & JP 61 240889 (Mitsubishi Electric Corp), Oct. 27, 1986.
Patent Abstracts of Japan, vol. 015, No. 428, Oct. 30, 1991 & JP 03 178565 (Toshiba Corp.), Aug. 2, 1991.

* cited by examiner

Primary Examiner—Harry B. Tanner
(74) Attorney, Agent, or Firm—Martin A. Farber

(57) ABSTRACT

In a method for driving an output stage by pulse-width modulation, which driving serves to supply a unit cooling the output stage during operation, at a higher temperature of the output stage a style of driving is performed which results in a low power loss in the output stage. At a lower temperature of the output stage driving is performed in such a way that the power loss is higher.

10 Claims, 1 Drawing Sheet

METHOD FOR DRIVING AN OUTPUT STAGE BY PULSE-WIDTH MODULATION

FIELD AND BACKGROUND OF THE INVENTION

The invention relates to a method for driving an output stage by pulse-width modulation, which driving serves to supply a unit cooling the output stage during operation.

If electric motors are used to drive cooling units, in particular refrigerating machines of air conditioners or fans in motor vehicles, the cooling can also be used to cool the output stage. Various requirements have to be considered in the case of driving the output stage by pulse-width modulation (PWM)—inter alia with regard to electromagnetic compatibility and noise intrusions at frequencies below the auditory threshold. These requirements are, however, frequently opposed to a high edge steepness or to a low frequency of the pulses, which are desirable in order to achieve the lowest possible power loss in the output stage.

SUMMARY OF THE INVENTION

It is the object of the present invention to design a style of driving an output stage, which driving serves to supply a unit cooling the output stage during operation, in such a way that both the said ambient conditions are generally satisfied, and overloading of the output stage at high ambient temperatures owing to a high power loss is avoided.

According to the invention, this object is achieved by virtue of the fact that at a higher temperature of the output stage a style of driving is performed which results in a low power loss in the output stage, and that at a lower temperature of the output stage driving is performed in such a way that the power loss is higher.

The invention is based on the finding that by cooling during operation for the benefit of the ambient conditions it is possible to permit a higher power loss, whereas when there is no cooling, something which is substantially the case in a short run-up phase, it is possible to permit a somewhat more unfavorable environmental response.

A first embodiment of the invention reduces the power loss during the run-up phase by virtue of the fact that at a higher temperature driving is performed with pulses of higher edge steepness, and at a lower temperature it is performed with pulses of lower edge steepness, whereas a second embodiment reduces the power loss during the run-up phase by virtue of the fact that at a higher temperature driving is performed with a lower PWM carrier frequency than at a lower temperature. It is also possible for the two embodiments to be combined with one another.

Depending on the detail of the preconditions, it is possible to provide in the case of the method according to the invention that there is a gradual transition or that a switchover is made between two styles of driving.

A further refinement of the method according to the invention proceeds from the fact that the higher temperatures occur in a run-up phase, and therefore provide that the transition from a style of driving which is provided at a higher temperature to a style of driving for a lower temperature is performed under time control after switching on. As a result, there is no need either for a temperature sensor nor for a circuit evaluating the output signal thereof.

It is provided according to another embodiment that a selection is made between the styles of driving as a function of a measured temperature. Possible temperature increases outside the run-up phase are also taken into account in this case. Already existing temperature sensors can also be used, if appropriate.

BRIEF DESCRIPTION OF THE DRAWING

The invention permits numerous embodiments. One of these is illustrated diagrammatically in the drawing with the aid of a plurality of figures and is described below. In the drawing.

DETAILED DESCRIPTION OF THE PREFERRED EMBODIMENTS

Figure 1:
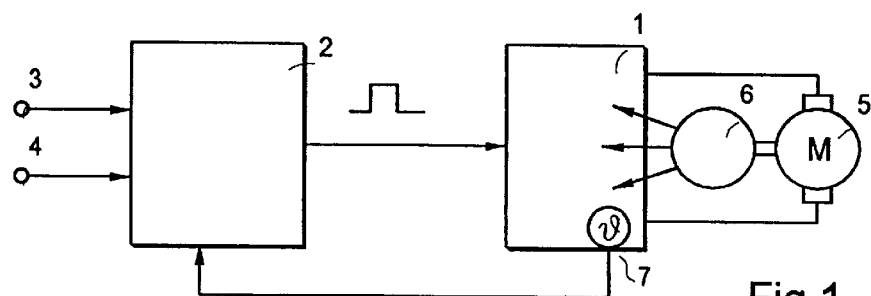
FIG. 1 shows an arrangement for carrying out the method according to the invention.

FIG. 1 shows as a block diagram in a greatly simplified form an output stage 1 which is driven by a control device 2 with pulse-width-modulated signals. Various signals required for controlling purposes, for example input/output signals or speed/temperature stipulations can be fed to the control device via the inputs 3 and 4. The output stage 1 supplies a motor 5, which drives a refrigerating unit 6. The refrigerating unit is connected in a thermally conducting fashion to the output stage 1, and this is symbolized by arrows. A temperature sensor 7 measures the temperature of the output stage 1 or of another point in the system which has a good correlation with the output stage temperature, and passes the measurement result to control device 2.

Figure 2:
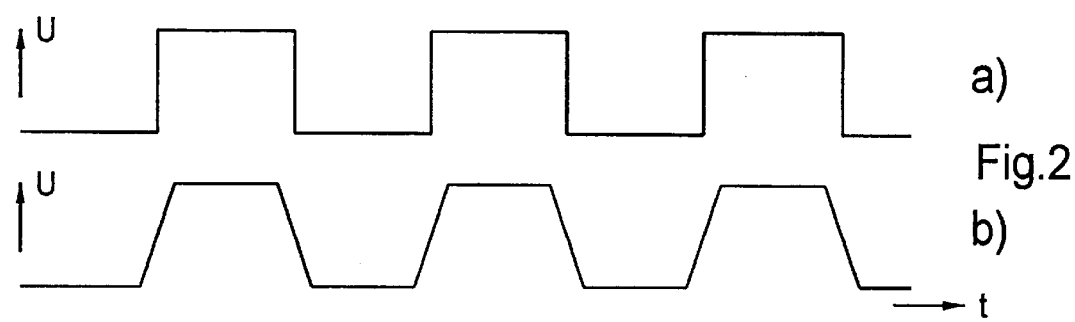
FIG. 2 shows pulse diagrams in the case of a first embodiment of the method according to the invention.

In the first embodiment of the method according to the invention, according to FIG. 2a) the output stage 1 receives pulses with steep edges such that the power loss in the output stage 1 is so low that even at a higher temperature the permissible maximum temperature of the output stage transistors is not exceeded. Such high temperatures can also occur, for example, in the engine compartment when a motor vehicle is parked after being driven quickly and/or at high ambient temperatures. After a run-up phase, the output stage 1 is cooled by the refrigerating unit 6. A changeover is then made to the pulses shown in FIG. 2b), although, because of their lower edge steepness, the said pulses result in a higher power loss in the output stage, but exhibit a weaker interfering effect in higher frequency ranges of the electromagnetic emission.

Figure 3:
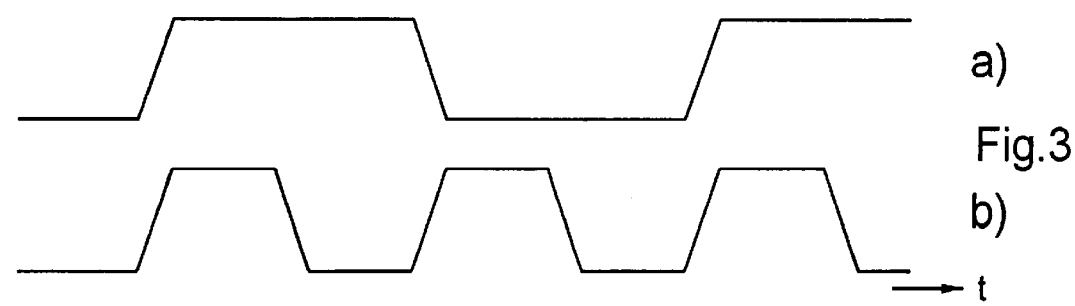
FIG. 3 shows pulse diagrams in the case of a second embodiment.

FIG. 3 shows an alternative, specifically switching over the carrier frequency, a lower frequency being provided in the run-up phase shown in FIG. 3a), with the result that the power loss caused by the finite edges is lower. Short-term noise emission is possible in return when the frequency is below 16 kHz. After the lower operating temperature has been reached, a switchover is made to a high frequency above the range of audibility with edges which are not excessively steep (FIG. 3b)).

Figures 4, 5:
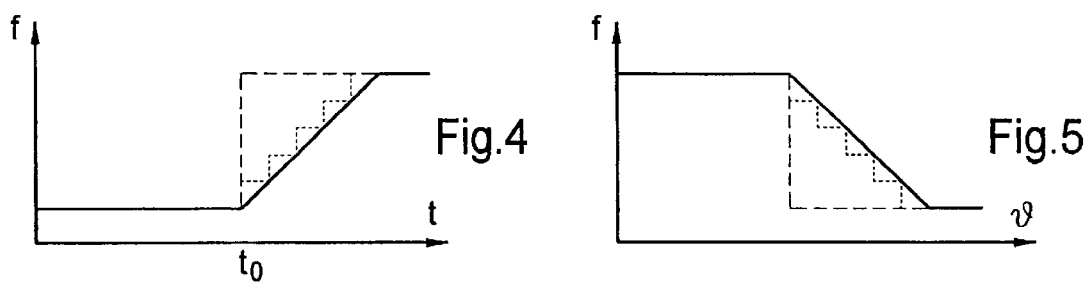
FIG. 4 shows the drive frequency as a function of time.
FIG. 5 shows the frequency as a function of temperature.

FIG. 4 shows the switchover of the frequency after a prescribed time t_0 from a lower to a higher value, as is illustrated by way of example in FIG. 3.

Figures 6, 7:
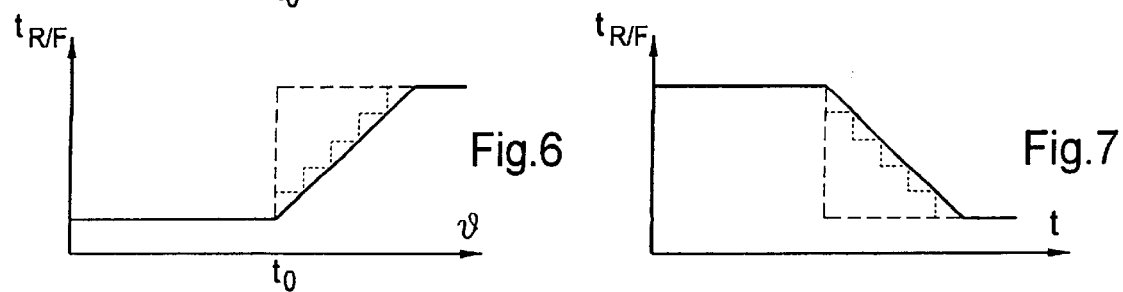
FIG. 6 shows the edge steepness (tR/F) as a function of temperature.
FIG. 7 shows the edge steepness (tR/F) as a function of time.

FIG. 5 shows the frequency f as a function of the temperature theta, the frequency being high at lower temperatures and low at higher ones. FIG. 6 shows the edge steepness t_R/F as a function of temperature, and FIG. 7 shows it as a function of time.

Depending on the preconditions that are present, the transition can be performed continuously (continuous line) or in a plurality of stages or in one stage (dashed or dotted lines).

In many cases, the run-up time is very short and is, for example, 10s to 15s for air-conditioning compressors.

I claim:

1. Method for driving a transistor output stage by pulse-width modulation of driving pulses, the output stage supplying a unit cooling the output stage during operation, the method comprising the steps wherein, at a higher temperature of the output stage, driving pulses which result in a low power loss in the output stage are applied to the output stage, and at a lower temperature of the output stage, driving pulses which result in a higher power loss in the output stage are applied to the output stage.

2. Method according to claim 1, wherein said driving pulses have a higher edge steepness at a higher temperature and a lower edge steepness at a lower temperature.

3. Method according to claim 1, wherein said driving pulses have a higher pulse repetition frequency at a higher temperature and a lower pulse repetition frequency at a lower temperature.

4. Method according to claim 1, wherein there is a gradual transition between driving pulses which result in a low power loss in the output stage and driving pulses which result in a higher power loss in the output stage.

5. Method according to claim 1, wherein a switchover takes place between driving pulses which result in a low power loss in the output stage and driving pulses which result in a higher power loss in the output stage.

6. Method according to claim 1, wherein a transition between driving pulses which result in a low power loss in the output stage and driving pulses which result in a higher power loss in the output stage is performed under time control after switching on.

7. Method according to claim 1, wherein a selection is made between driving pulses which result in a low power loss in the output stage and driving pulses which result in a higher power loss in the output stage as a function of a measured temperature.

8. Method according to claim 1, wherein a selection is made between driving pulses which result in a low power loss in the output stage and driving pulses which result in a higher power loss as a function of a measured temperature and under time control after switching by pulse-width modulation.

9. Method for driving a transistor output stage for powering a motor of a cooling unit, the cooling unit serving to cool the output stage, the method comprising the steps of:

driving the output stage by a pulse train, modulating the pulse train by pulse-width modulation, sensing a temperature of the output stage, and altering a rate of change of an edge of a pulse of the pulse train by increasing the rate of change for reduced power dissipation in a transistor of the output stage and by decreasing the rate of change for increased power dissipation in the transistor of the output stage to compensate for a change in the temperature of the output stage.

10. Method for driving a transistor output stage for powering a motor of a cooling unit, the cooling unit serving to cool the output stage, the method comprising the steps of:

driving the output stage by a pulse train, modulating the pulse train by a modulation of a pulse-repetition frequency of the pulse train, sensing a temperature of the output stage, and altering a rate of change of an edge of a pulse of the pulse train by increasing the rate of change for reduced power dissipation in a transistor of the output stage and by decreasing the rate of change for increased power dissipation in the transistor of the output stage to compensate for a change in the temperature of the output stage.

* * * * *